US012692135B2

(12) United States Patent
Farrell et al.

(10) Patent No.: US 12,692,135 B2
(45) Date of Patent: Jul. 28, 2026

(54) LOW-PROFILE NESTED CRANE

(71) Applicant: THE DYNAMIC ENGINEERING SOLUTION PTY LTD, Holden Hill (AU)

(72) Inventors: Adam Farrell, Holden Hill (AU); Andrew Loizides, Holden Hill (AU)

(73) Assignee: THE DYNAMIC ENGINEERING SOLUTION PTY LTD, Holden Hill (AU)

( * ) Notice: Subject to any disclaimer, the term of this patent is extended or adjusted under 35 U.S.C. 154(b) by 272 days.

(21) Appl. No.: 18/285,256

(22) PCT Filed: Mar. 30, 2022

(86) PCT No.: PCT/AU2022/050291
§ 371 (c)(1),
(2) Date: Oct. 1, 2023

(87) PCT Pub. No.: WO2022/204760
PCT Pub. Date: Oct. 6, 2022

(65) Prior Publication Data

US 2024/0174495 A1 May 30, 2024

(30) Foreign Application Priority Data

Mar. 30, 2021 (AU) ................................ 2021900940

(51) Int. Cl.
*B66C 23/00* (2006.01)
*B66C 23/70* (2006.01)

(52) U.S. Cl.
CPC ............ *B66C 23/54* (2013.01); *B66C 23/701* (2013.01); *B66C 2700/0371* (2013.01)

(58) Field of Classification Search
CPC ..... B66C 23/54; B66C 23/701; B66C 23/702; B66C 23/68; B66C 23/42; B66C 23/36; B60P 1/5433; B60P 1/5466; B60P 1/5485
See application file for complete search history.

(56) References Cited

U.S. PATENT DOCUMENTS

| | | | | |
|---|---|---|---|---|
| 2,755,939 A * | 7/1956 | Rush | B66C 13/18 212/238 |
| 3,819,059 A * | 6/1974 | Mantel | B66C 23/54 212/300 |

(Continued)

FOREIGN PATENT DOCUMENTS

| | | |
|---|---|---|
| CN | 110626964 A | 12/2019 |
| DE | 202011101049 U1 | 9/2011 |
| EP | 1607363 A3 | 12/2005 |

OTHER PUBLICATIONS

EP 1,607,363 A2 Machine Translation. (Year: 2005).*
Supashock Defence Advanced Defence Mobility Systems, Rheinmetall Defence, 6 pages, 2020.

*Primary Examiner* — Robert W Hodge
*Assistant Examiner* — Juan J Campos, Jr.
(74) *Attorney, Agent, or Firm* — Maschoff Brennan

(57) ABSTRACT

A crane for mounting to a vehicle, comprising a base defining a plane, a column member pivotally connected with respect to the base at a first end, and a column lifting arrangement, configured to adjust an angle of the column member with respect to the plane, wherein the column member is configured to be moved between a retracted position, where the column member lies substantially parallel with the plane defined by the base, through to a fully extended position, where the angle between the column member and the plane defined by the base is greater than 90 degrees.

12 Claims, 11 Drawing Sheets

(56) References Cited

U.S. PATENT DOCUMENTS

| | | | | |
|---|---|---|---|---|
| 4,623,067 | A | 11/1986 | Hejlik | |
| 5,584,646 | A * | 12/1996 | Lewis | B66C 23/36 414/738 |
| 6,220,292 | B1 * | 4/2001 | Woodling | B66C 23/42 137/355.16 |
| 2014/0096853 | A1 * | 4/2014 | Neubert | E04G 21/0418 137/615 |

* cited by examiner

LOW-PROFILE NESTED CRANE

PRIORITY DOCUMENTS

The present application claims priority from Australian Provisional Patent Application No. 2021900940 titled "CRANE" and filed on 30 Mar. 2021, the content of which is hereby incorporated by reference in its entirety.

TECHNICAL FIELD

The present invention relates to a crane. In a particular form the present invention relates to a crane for mounting to a vehicle.

BACKGROUND

Vehicle mounted cranes are typically used to load and unload trucks and other commercial vehicles. Vehicle mounted cranes are also used on military vehicles, where packaging requirements and capabilities of the cranes can be more complex and demanding than their commercial counterparts.

It is a common requirement that these cranes be capable of stowage, to be able to tuck in behind a vehicle cabin or other vehicle high point in order to improve aerodynamics and to get beneath bridges and other low structures, without the crane taking up valuable cargo space in doing so. In some applications, even tighter packaging of the crane is required, for instance, military vehicles are often transported in heavy transport aircraft, or by train, where they are required to be able to fit through tunnels whilst loaded on carriages. Existing cranes require at least partial disassembly and/or sacrifice of a portion of the cargo area to accommodate the crane when doing so.

Despite these tight packaging requirements, military applications still require these cranes to have strong lifting capacity and operating radius, to be capable of performing operations such as mounting vehicle weapons systems and vehicle armour and performing vehicle power plant replacements in addition to the more typical loading and unloading of containers and equipment on and off the cargo area of the vehicle.

It is also recognised that a single vehicle capable of performing multiple operations or tasks that would typically be achieved by more than one vehicle is valuable from at least a logistics and personnel perspective.

It is against this background that the present disclosure has been developed.

SUMMARY

According to a first aspect, there is provided a crane for mounting to a vehicle, comprising a base defining a plane, a column member pivotally connected with respect to the base at a first end, and a column lifting arrangement, configured to adjust an angle of the column member with respect to the plane, n herein the column member is configured to be moved between a retracted position, where the column member lies substantially parallel with the plane defined by the base, through to a fully extended position, where the angle between the column member and the plane defined by the base is greater than 90 degrees.

In one forum, the angle between the column member and the plane defined by the base when the column member is in its fully extended position is approximately 100 degrees.

In one form, the column lifting arrangement comprises a pair of hydraulic column cylinders pivotally connected at their first ends with respect to the base about an axis parallel to and spaced apart from that about which the column is pivotally connected with respect to the base, and pivotally connected at their second ends with respect to the second end of the column member, such that extension of the column cylinders causes an increase in the angle between the column member and the plane, and retraction of the column cylinders causes a decrease in the angle between the column member and the plane.

In one form, the column cylinders are double acting.

In one form, the crane further comprises a boom member pivotally connected with respect to the column member at its second end, and a boom lifting arrangement, configured to adjust an angle of the boom member with respect to the column member.

In one form, the boom member is configured to be moved between a retracted position, where the boom member lies substantially parallel with the column member, through to a fully extended position, where the angle between the boom member and column member is approximately 85 degrees.

In one form, the boom lifting arrangement comprises a pair of hydraulic boom cylinders pivotally connected at their first ends with respect to an intermediate portion of the column member and pivotally connected at their second ends with respect to an intermediate portion of the boom member, such that extension of the boom cylinders causes an increase in the angle between the boom member and the column member, and retraction of the boom cylinders causes a decrease in the angle between the boom member and the column member.

In one form, the boom cylinders are double acting.

In one form, the column member comprises parallel left and right web members, where the boom cylinders are positioned adjacent to one another with their first ends located between the left and right web members.

In one form, the boom cylinders are configured such that when they are fully retracted, the boom and column members are able to be positioned alongside each other in a substantially parallel relationship, with the boom cylinders configured to nest substantially between the left and right web members and the boom member.

In one form, the boom member comprises a main section to which the column member and boom cylinders pivotally depend.

In one form, the boom member further comprises a plurality of telescoping sections, wherein the furthest telescoping section terminates in a boom head.

According to a second aspect, there is provided a crane for mounting to a vehicle, the crane comprising a base defining a plane, a column member pivotally connected with respect to the base at a first end, a boom member pivotally connected with respect to the column at a second end, a column lifting arrangement, configured to adjust an angle of the column member with respect to the plane, and a boom lifting arrangement, configured to adjust an angle of the boom member with respect to the column member, wherein the crane is able to be moved between a collapsed configuration, where the column member lies substantially parallel with the plane defined by the base and the boom member lies substantially parallel with the column member through to a range of operational configurations where the angle between the column member and the plane defined by the base is anywhere between approximately 0 and 100 degrees and the angle between the boom member and column member is anywhere between approximately 0 and 85 degrees.

In one form, the column lifting arrangement comprises a pair of hydraulic column cylinders pivotally connected at their first ends with respect to the base about an axis parallel to and spaced apart from that about which the column is pivotally connected with respect to the base, and pivotally connected at their second ends with respect to the second end of the column member, such that extension of the column cylinders causes an increase in the angle between the column member and the plane, and retraction of the column cylinders causes a decrease in the angle between the column member and the plane.

In one form, the boom lifting arrangement comprises a pair of hydraulic boom cylinders pivotally connected at their first ends with respect to an intermediate portion of the column member and pivotally connected at their second ends with respect to an intermediate portion of the boom member, such that extension of the boom cylinders causes an increase in the angle between the boom member and the column member, and retraction of the boom cylinders causes a decrease in the angle between the boom member and the column member.

According to a third aspect, there is provided a vehicle comprising a body and a crane as claimed in any one of the preceding claims, mounted to the body of the vehicle.

In one form, the base of the crane is configured to be rotated with respect to the body of the vehicle.

BRIEF DESCRIPTION OF DRAWINGS

Embodiments of the present invention will be discussed with reference to the accompanying drawings wherein.

DESCRIPTION OF EMBODIMENTS

Figure 1:
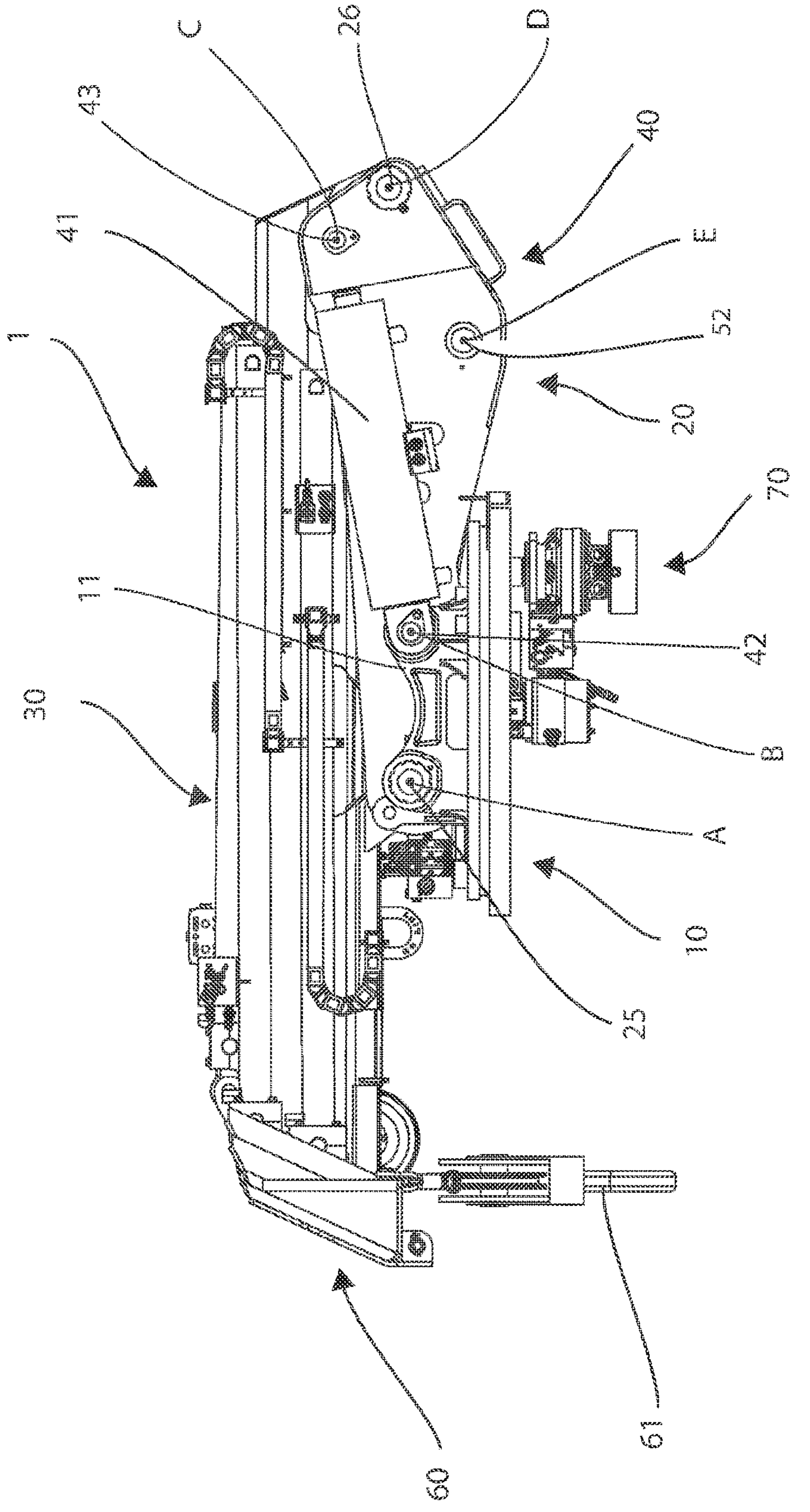
FIG. 1 is a side view of a crane for mounting to a vehicle, according to an embodiment, in a collapsed configuration.
Figure 2:
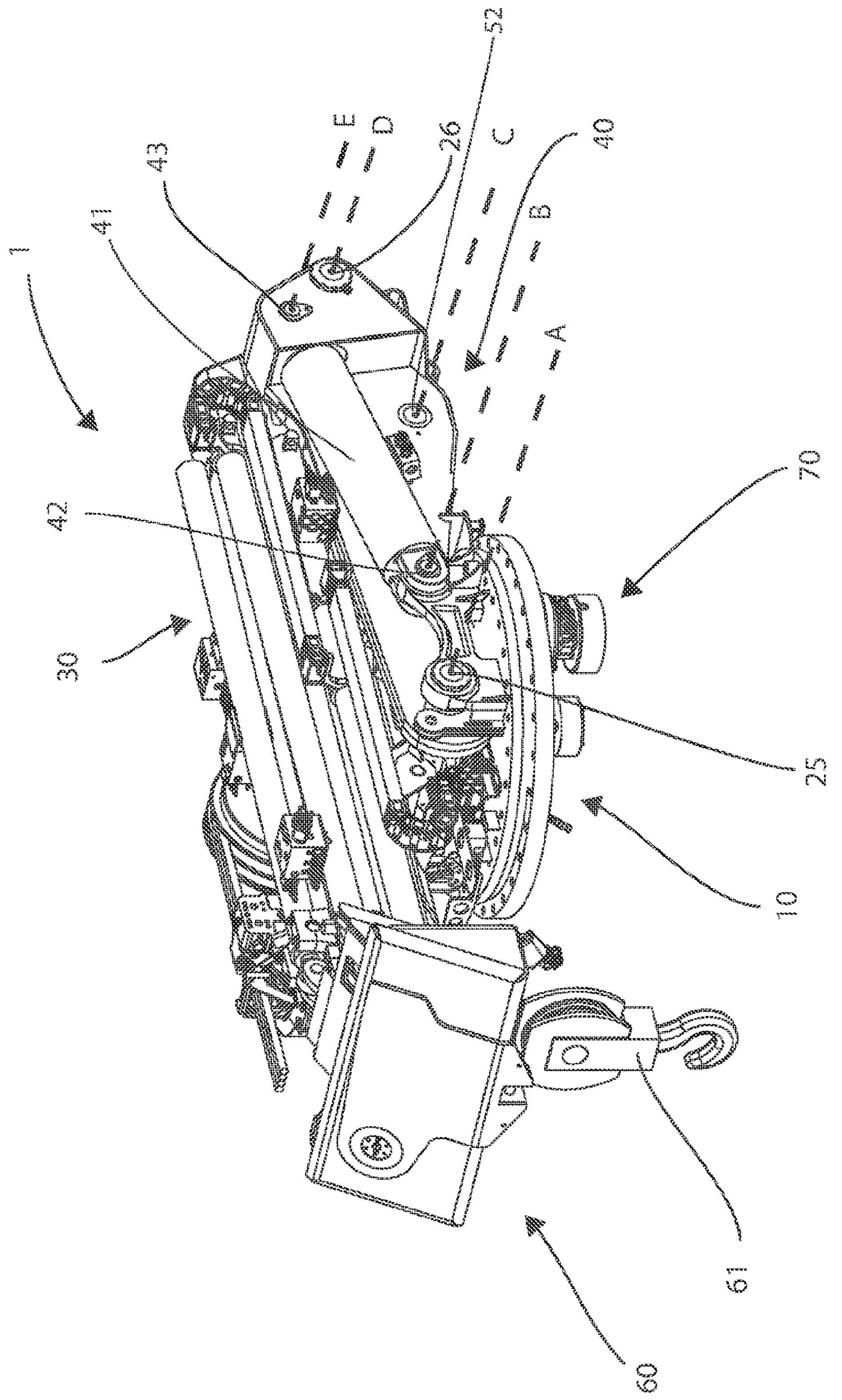
FIG. 2 is a perspective view of the crane of FIG. 1, in a collapsed configuration.
Figure 6:
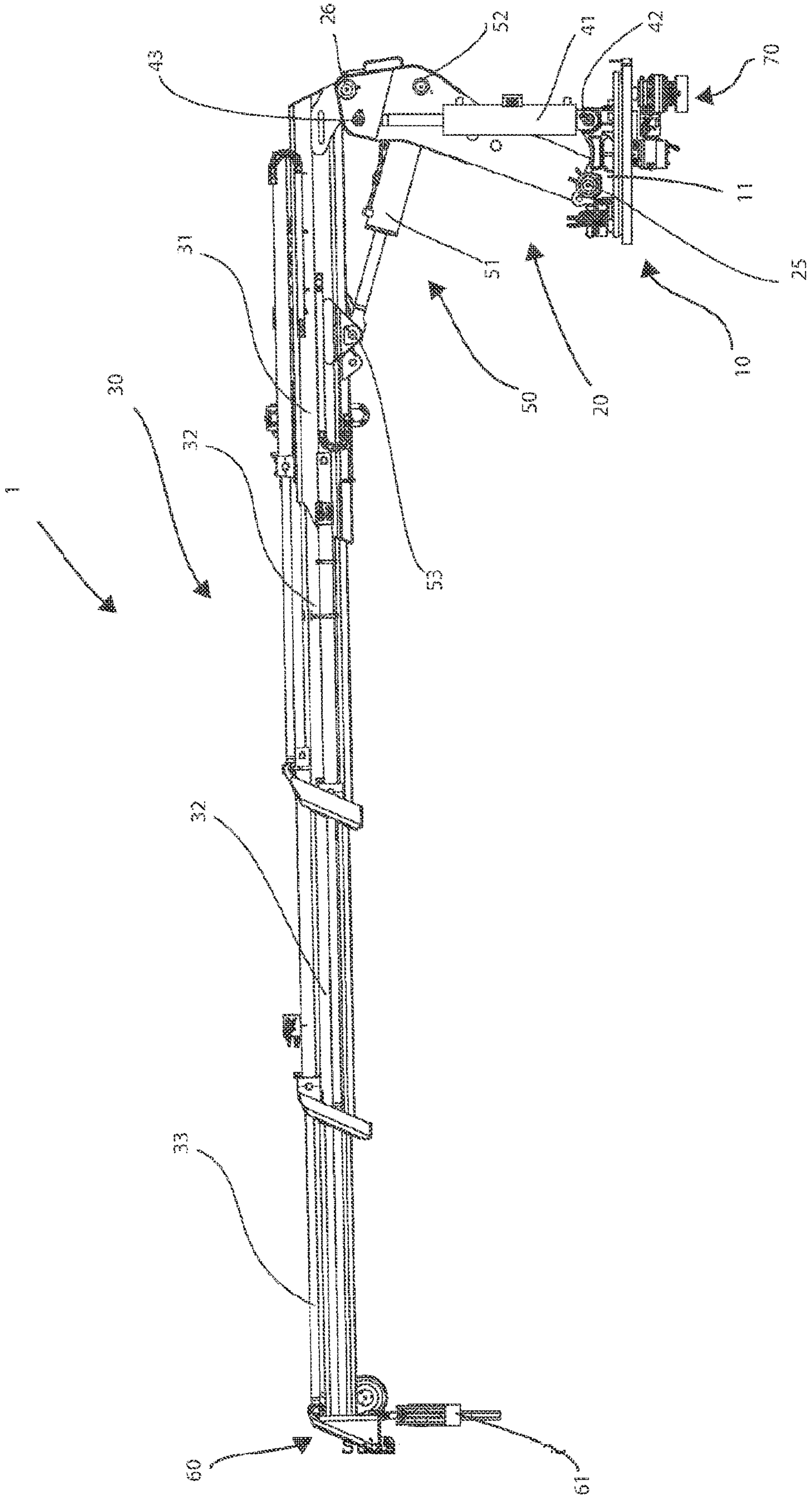
FIG. 6 is a side view of the crane of FIG. 1, in an operational configuration, with the boom at maximum extension.
Figure 7:
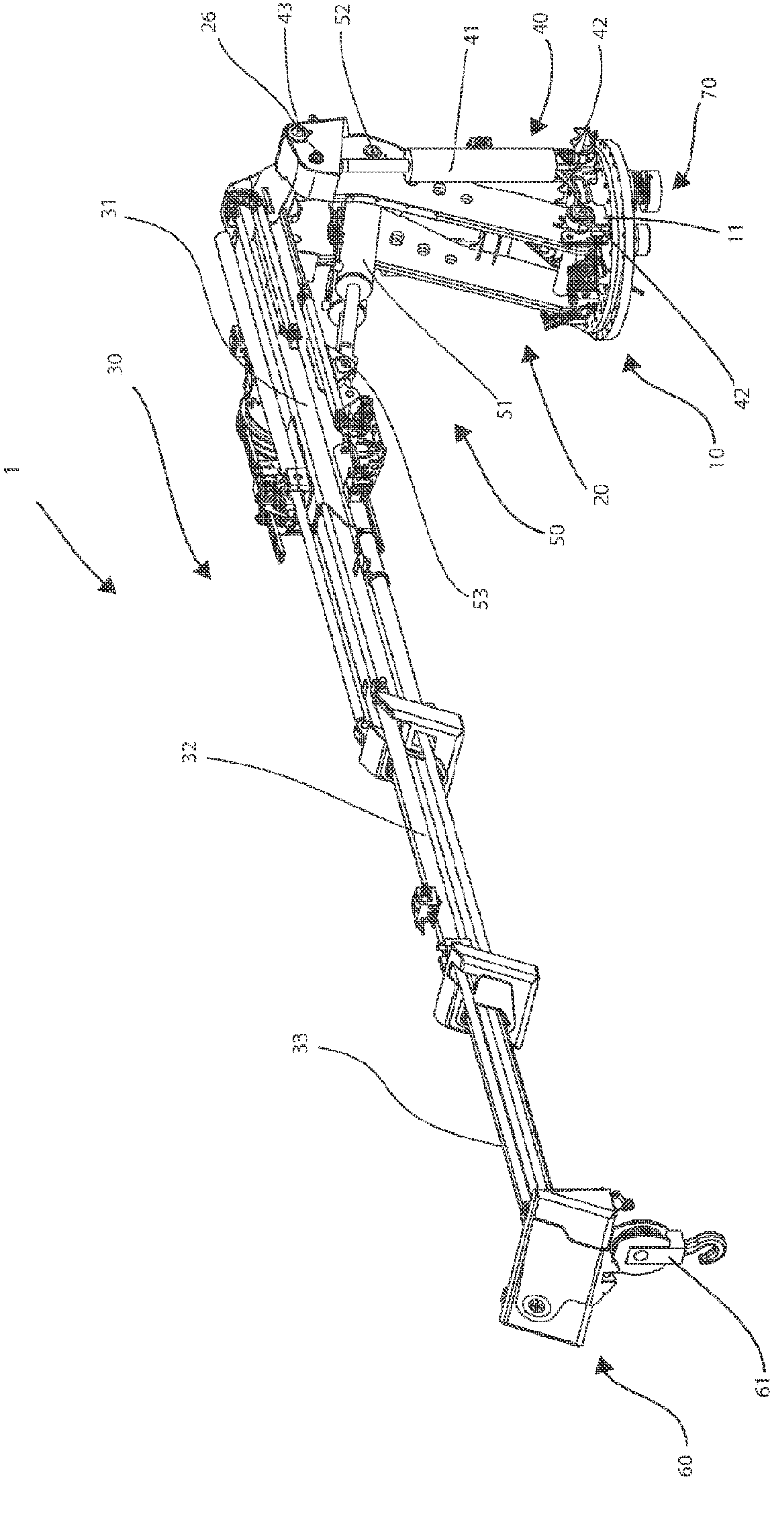
FIG. 7 is a perspective view of the crane of FIG. 1, in an operational configuration, with the boom at maximum extension.
Figure 8:
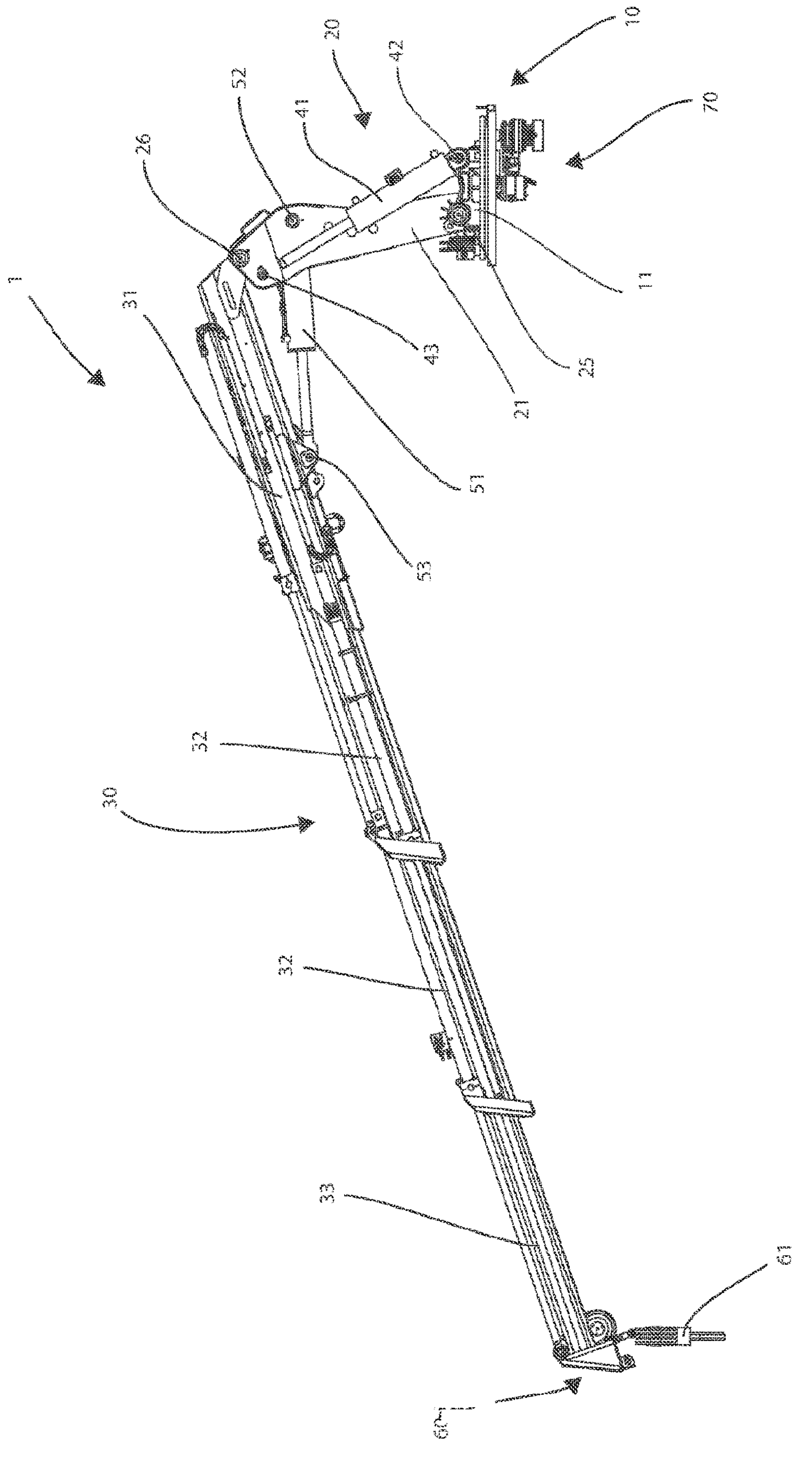
FIG. 8 is a side view of the crane of FIG. 1, in tool mode and at maximum extension.
Figure 9:
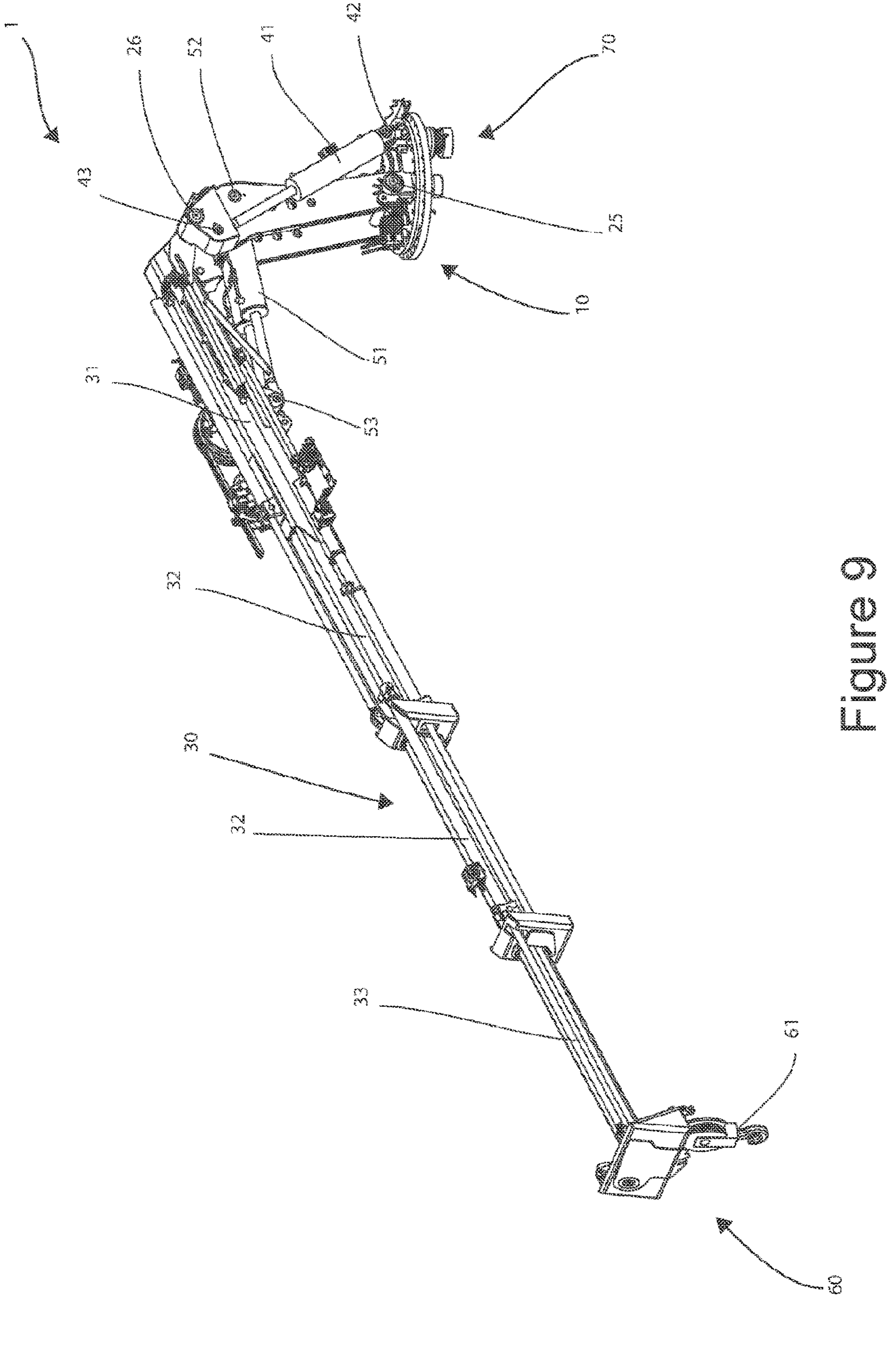
FIG. 9 is a perspective view of the crane of FIG. 1, in tool mode and at maximum extension.
Figure 10:
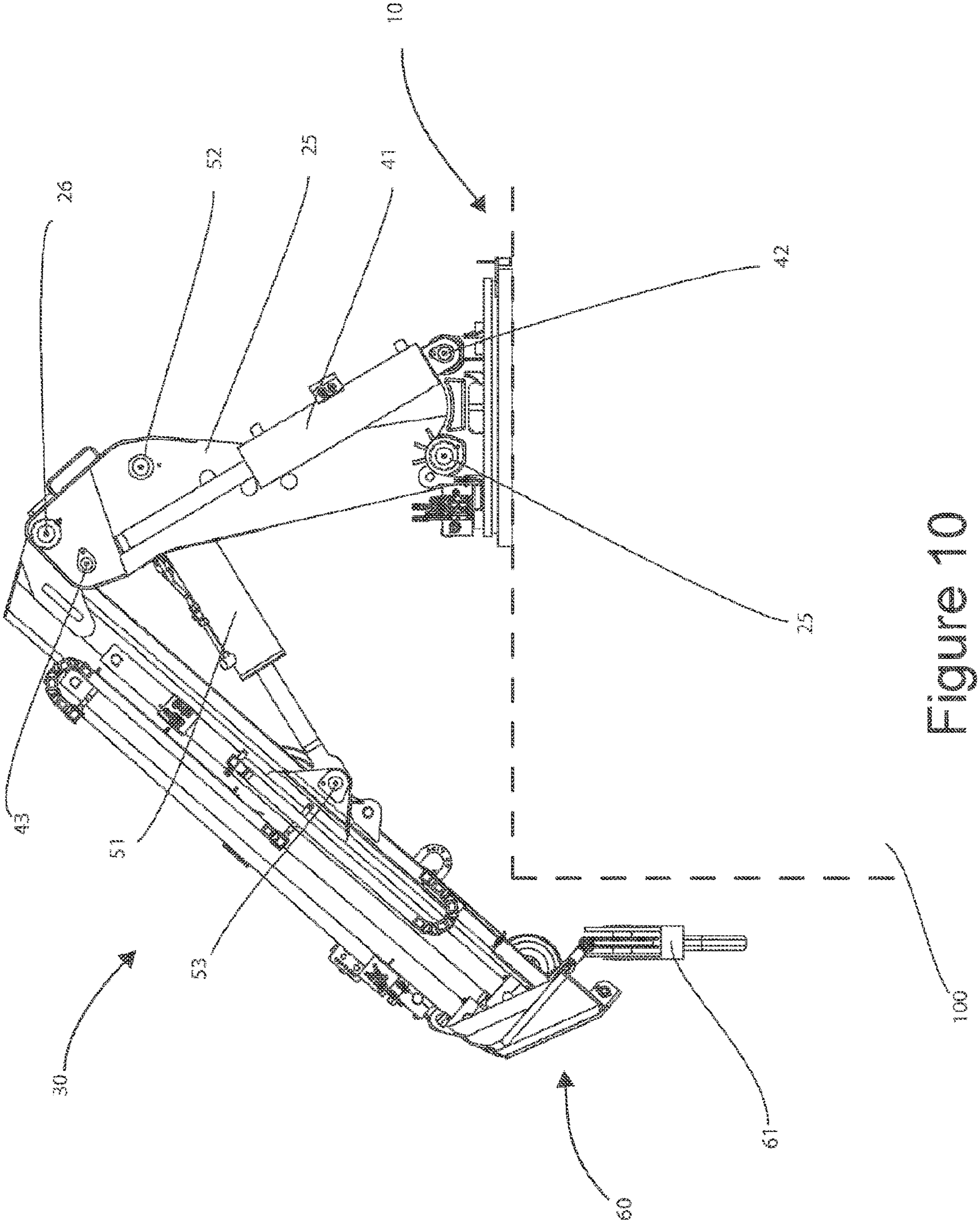
FIG. 10 is a side view of the crane of FIG. 1, in tool mode and at minimum extension.

Referring now to FIGS. 1 to 11, there is shown a crane 1 for mounting to a vehicle, comprising a base 10 defining a plane, a column member 20 pivotally connected with respect to the base 10 at a first end 25, and a column lifting arrangement 40, configured to adjust the angle of the column member 20 with respect to the base 10, wherein the column member 20 is able to be moved between a retracted position (as best shown in FIGS. 1 and 2) where the column member 20 lies substantially parallel with the plane defined by the base 10, through to an extended position (as best shown in FIGS. 8 to 10), where the angle between the column member 20 and the plane defined by the base 10 is greater than 90 degrees.

It will be appreciated that by providing a crane 1 with a column member 20 that is capable of being moved between a retracted position and an extended position, that when in the retracted position, the overall height of the crane 1 in a collapsed configuration as shown in FIGS. 1 and 2 is able to be substantially lower than a crane whose column member is fixed (as will be described in further detail below).

It will further be appreciated that by providing a crane 1 with a column member 20 that is capable of extending further than 90 degrees, also referred to as going over-centre, as best shown in FIGS. 8 to 10, that the maximum operating radius of the crane 1 is able to be increased when compared with a crane whose column member is fixed. It will also be appreciated that the minimum operating radius of the crane 1 is able to be decreased when compared with a crane whose column member is fixed (as will be described in further detail below).

Figure 4:
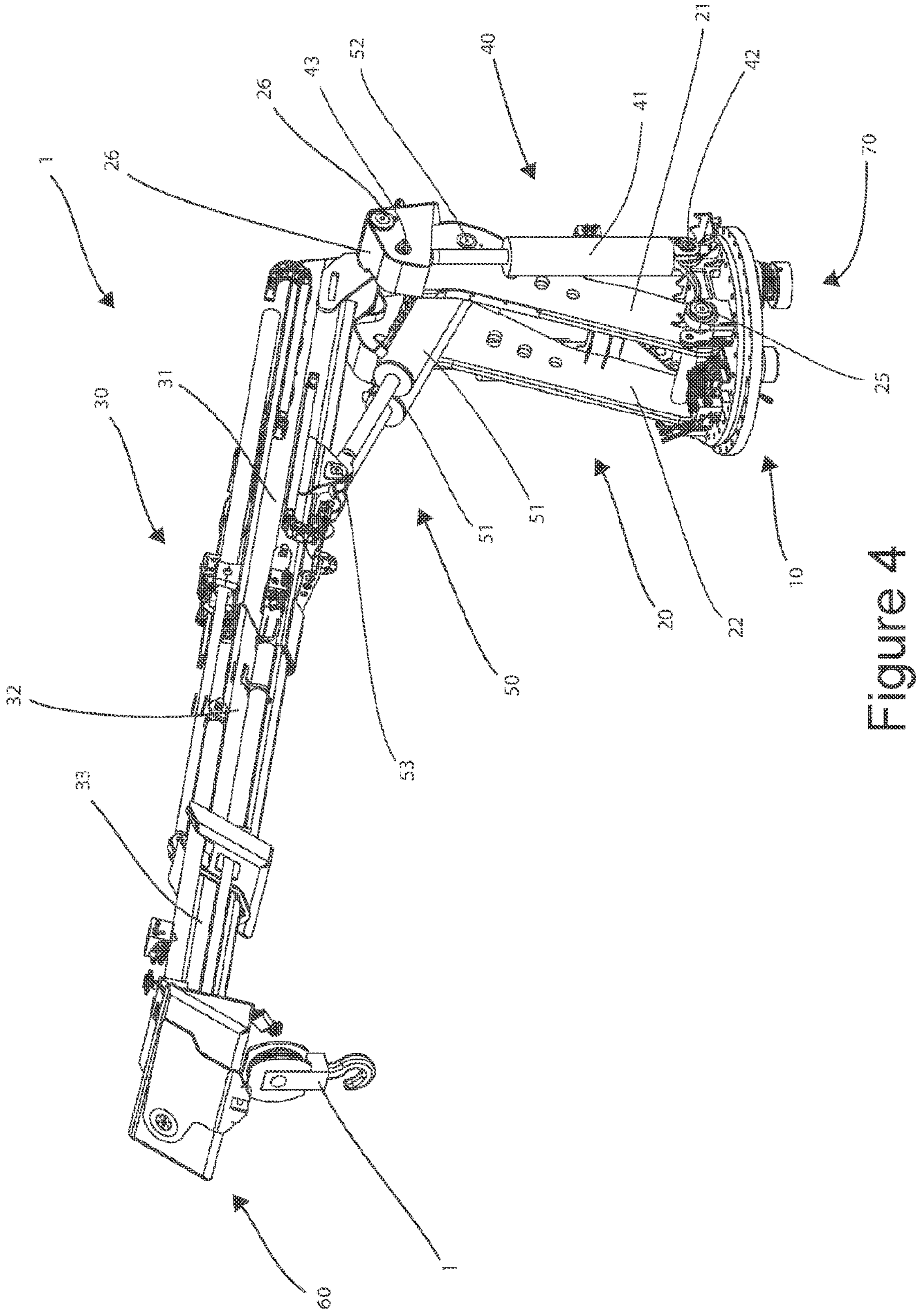
FIG. 4 is a perspective view of the crane of FIG. 1, in an operational configuration, with the boom at partial extension.

As best shown in FIG. 4, the column member 20 comprises parallel left and right web members 21, 22 connected together along their length by a number of interconnecting components including a lower plate and an upper plate 23, 24, collectively forming a rigid structure. It can be seen that the base comprises a pair of flange members 11 to which first ends of the respective left and right web members 21, 22 are pivotally attached.

The column lifting arrangement 40 comprises a pair of double acting hydraulic column cylinders 41. It can be seen that a first end 42 of each of the cylinders 41 is pivotally connected with respect to the base 10 via a corresponding flange member 11 (about an axis parallel with, but spaced apart to that winch the column member 20 pivots) and that a second end 43 of each cylinder 41 is pivotally connected to a respective web member at the second end 26 of the column 20, where, by virtue of the first ends 42 of the column cylinders 41 and the column member 20 mutually rotating about parallel axes with respect to the base 10, and the second ends 43 of the column cylinders 41 being pivotally connected with respect to the second end 26 of the column member 20, an extension of the column cylinders 41 causes an increase in the angle between the column member 20 and plane defined by the base 10, and conversely, retraction of the column cylinders 41 causes a decrease in the angle between the column member 20 and plane defined by the base 10.

It can also be seen that the second end of each column web member 21, 22 features a protective shroud 23 within which the second ends 43 of each cylinder 41 are pivotally connected with respect to a respective web member.

It will be appreciated that by virtue of the fact that the column member 20 is capable of being driven over-centre, that double acting cylinders 41 are required to not only resist further extension of the cylinders due to the effects of gravity, but also to be able return the column member 20 beyond-over centre.

It can also be seen that the two column cylinders 41 are positioned at either side of the column member 20 outside, rather than between the respective web members 21, 22, such that they are not within the range of movement of the column member 20, meaning that the column cylinders 41 do not interfere with the column member 20 achieving a retracted position substantially parallel with the plane defined by the base 10. It will also be appreciated that this positioning of the column cylinders 31 provides more freedom with respect to cylinder sizing.

It can be seen that the first end 25 of the column member 20 is pivotally connected with respect to the base 10 such that it pivots about a first pivot axis A, that the first ends 42 of each of the column cylinders 40 are pivotally connected with respect to the base 10 such that they pivot about a second pivot axis B, and that the second ends 43 of each of the column cylinders are pivotally connected with respect to the second end 26 of the column member such that they pivot about a third pivot axis C.

It can also be seen that the crane 1 further comprises a boom member 30 pivotally connected with respect to the column member at its second end 26, and a boom lifting arrangement 50 configured to adjust an angle of the boom member with respect to the column member.

It can also be seen that the boom member 30 is pivotally connected with respect to the column member at its second end 26, such that at least a portion of the boom member 30 locates between the left and right web members 21, 22 of the column member 20.

The boom lifting arrangement 50 comprises a pair of hydraulic boom cylinders 51. It can be seen that a first end 52 of each of the boom cylinders 51 is pivotally connected with respect to an intermediate portion of the column member 20, and that a second end 53 of each boom cylinder 51 is pivotally connected with respect to an intermediate portion of the boom member 30, where, by virtue of the pivotal relationship between the boom member 30 and the column member 20, and the pivotal connection of the boom cylinders 51 with respect to the boom member 30 and the column member 20, an extension of the boom cylinders 51 causes an increase in the angle between the boom and column members 30, 20, and conversely, retraction of the boom cylinders 51 causes a decrease in the angle between the boom and column members 30, 20.

While the boom cylinders 51 may be single or double acting (where in the case of single acting cylinders, the weight of the boom member 30 and any load it may be carving may be relied upon to retract the boom cylinders 51), it will be appreciated that when the boom cylinders 51 are double acting, the boom member 30 is able to be driven in both directions quickly and in a controlled manner, without reliance on gravity. It will further be appreciated that the double acting cylinders are capable of pushing and pulling with the same force, such that the boom member 30 is able to raise and lower with the same force.

It can be seen that the two boom cylinders 51 are positioned adjacent to one another with their first ends 52 located between the two web members 21, 22 of the column member 20, and configured such that when they are fully retracted, the boom and column members 30, 20 are able to be positioned alongside each other in a substantially parallel relationship (as shown in FIGS. 1 and 2) with the boom cylinders configured to nest substantially between the left and right web members and the boom member. It can also be seen that by virtue of at least a portion of the boom member 30 locating between the left and right web members 21, 22 of the column member 20, that when the boom cylinders 51 are fully retracted, a lower portion of the boom member locates between the left and right web members.

It will be appreciated that by providing two boom cylinders 51 as opposed to one that the same hydraulic cross sectional area (and consequently, the same lifting capability for a fixed hydraulic pressure) can be delivered with cylinders having an overall smaller diameter, which improves the ability of the boom cylinders 51 to nest within the column member 20 and allow the boom and column members 30, 20 to be positioned alongside each other without interference. In the embodiment shown, by packaging two boom cylinders 51 alongside each other between the left and right web members 21, 22 of the column member 20, a greater overall cross-sectional area is able to be achieved than what would be able to be achieved by a single cylinder fitting in the same available space, while still allowing the boom and column members 30, 20 to be positioned alongside each other without interference.

As best shown in FIGS. 6 and 7, the boom member 30 comprises a main section 31 to which the column member 20 and boom cylinders 51 pivotally depend. It also comprises a plurality of telescoping sections 32 wherein the furthest telescoping section 33 terminates at a boom head 6). The boom lead 60 is configured to receive a number of different attachments to be used to lift loads, such as a hook and pulley arrangement 61 (as shown) as well as a number of ground attachments to be used when operating in a ground engaging or tool mode (described below).

It can be seen that the boom member 30 is pivotally connected with respect to the second end 26 of the column member 20 such that it pivots about a fourth pivot axis D. It can be seen that the first ends 52 of each of the boom cylinders 50 are pivotally connected with respect to an intermediate portion of the column member 20 such that they pivot about a fifth pivot axis E. It can be seen that the second ends 53 of each of the boom cylinders 50 are pivotally connected with respect to an intermediate portion of the boom member 30 such that they pivot about a sixth pivot axis F.

Referring now to FIGS. 1 and 2, where the crane 1 is shown in a collapsed configuration. It can be seen that the column cylinders 41 are fully retracted such that the column member 20 is in its retracted position, substantially parallel with the base 10. The boon cylinders 51 (not shown when in the collapsed configuration, due to being nested between the column web members 21, 22 and boom member 30) are also fully retracted such that the angle between the boom member 30 and column member 20 is minimised, with the respective members in a substantially parallel relationship. It can also be seen that the telescopic sections of the boon 32, 33 are fully retracted. As previously stated, the ability of the column member 20 to be fully retracted alongside the base 10 allows for the entire crane assembly 1 to be stowed or collapsed with an overall height substantially lower than typical vehicle mounted cranes featuring fixed column members. It will further be appreciated that the ability of the boom member to move to a substantially parallel position alongside the column member, with a portion of the boom member locating between the left and right web members also assists in lowering the overall collapsed height of the crane assembly 1.

Referring again to FIGS. 1 and 2, it can be seen that when the crane 1 is in its collapsed configuration, the first, second and fourth pivot axes A, B and D are at or substantially near to laying in the same plane, parallel to the plane defined by the base 10. It can also be seen that the pivot axis E where the boom member 30 is pivotally connected to the column member 20 is lower than this plane, further contributing to the compactness of the crane when collapsed.

Figure 3:
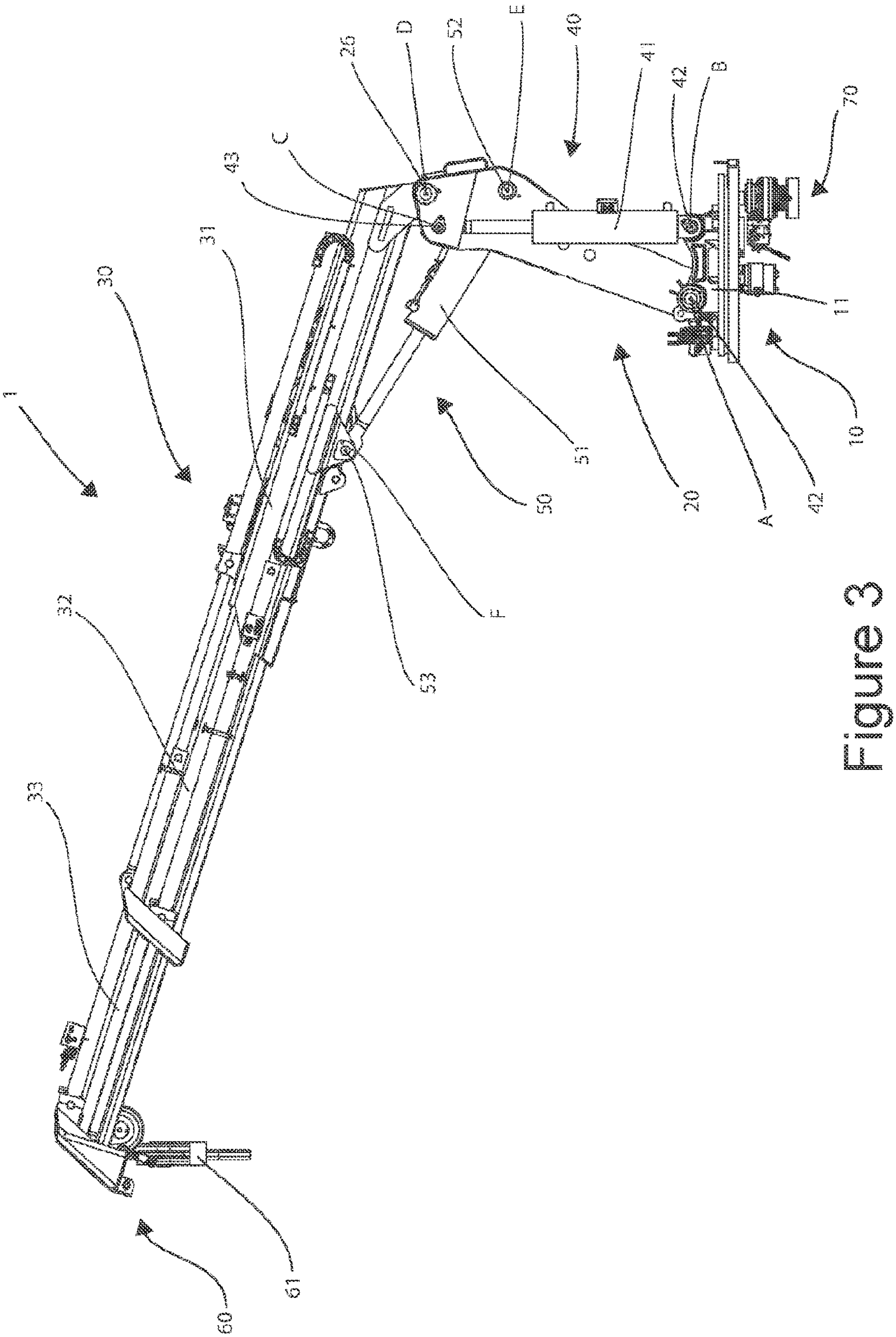
FIG. 3 is a side view of the crane of FIG. 1, in an operational configuration.
Figure 5:
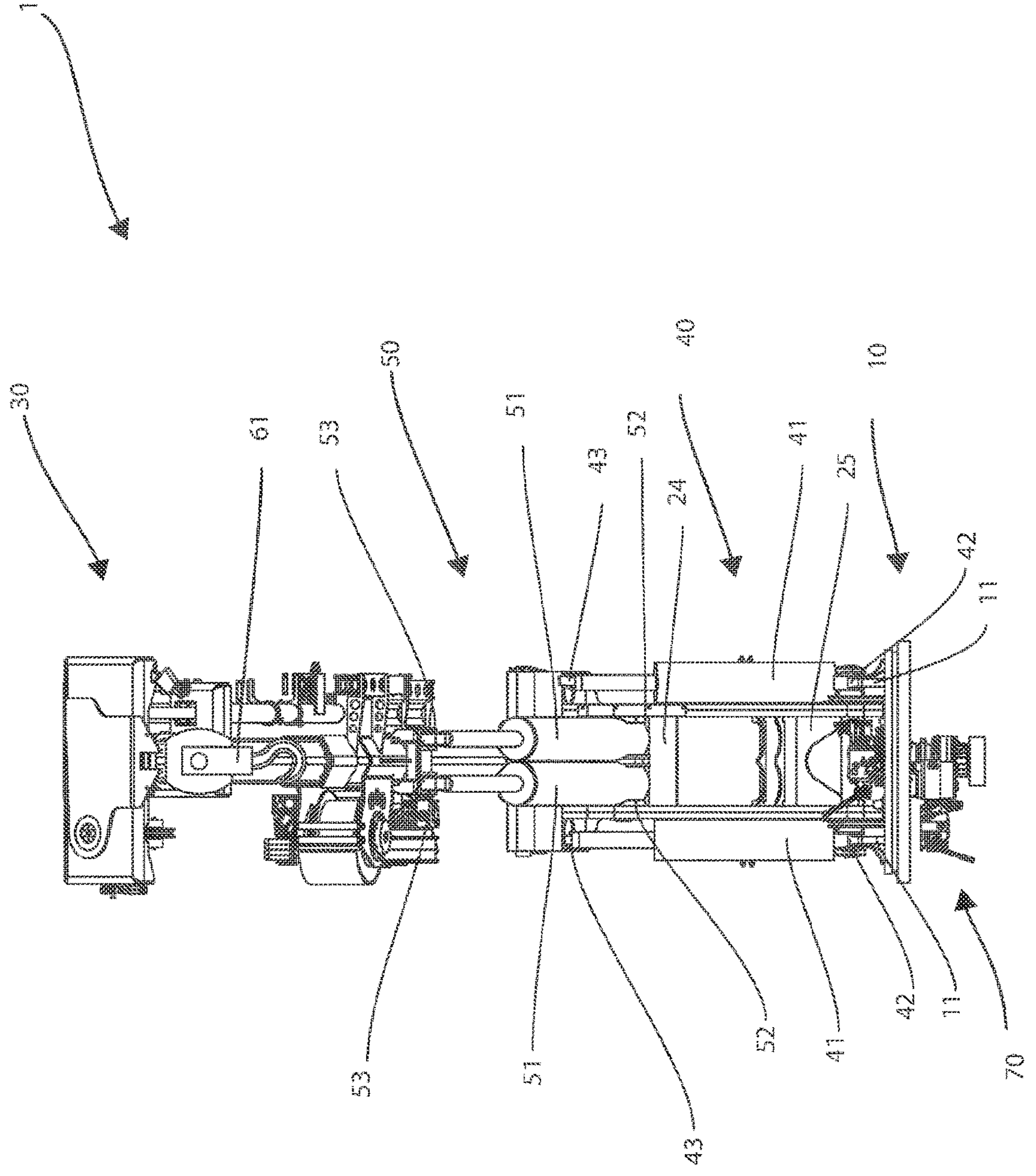
FIG. 5 is a front view of the crane of FIG. 1, in an operational configuration, with the boom at partial extension.

With reference now to FIGS. 3 to 5, where the crane 1 is shown in an operational configuration, ready for lifting loads, it can be seen that the column cylinders 41 are extended, such that the column member 20 is pivoted away from the retracted position and to an operational position, such that the angle between the base and the column is increased. It can also be seen that the boom cylinders 51 are extended, such that the angle between the boom member 30 and the column member 20 is increased, and the telescoping sections 32, 33 of the boom are partially extended.

While m the embodiment shown, the angle formed between the column and base is approximately 65 degrees, and the angle between the boom and column is approximately 85 degrees, it will be appreciated that the angles between the column member 20 and base 10, and the boom member 30 and column member 20, and the degree of extension of the telescopic sections 32, 33 of the boom member 30 may be vaned depending on operational requirements. For example, FIGS. 6 and 7 show an example where the telescopic sections 32, 33 of the boom member 30 are fully extended, and the angle between the boom member 30 and column member 20 is such that the boom is substantially parallel with the plane defined by the base.

It will be appreciated that by virtue of the twin column cylinders 41, twin boom cylinders 51, and their packaging with respect to the column and boom members 20, 30 respectively, that the above described crane 1 is capable of tight packaging when collapsed or stowed, but without compromising its lifting capacity, height or operational radius.

With reference to FIGS. 8 to 11, it can be seen that the crane 1 is also able to be operated in a ground engaging “tool mode” with ground engaging tools such as augers for creating holes in the ground and grab buckets for lifting equipment or debris. These ground engaging tools are able to be connected to control systems such as hydraulic circuits provided on the crane 1. These tools may be able to be operated remotely through control systems used to actuate the crane 1, alternatively, they may feature on board controls.

It will be appreciated that by virtue of the double acting boom cylinders 51, that the ground engaging tools may be driven or forced by the boom member 30 in to the ground as required. As previously discussed, by virtue of the double acting boom cylinders 51, the boom member 30 is able to be driven toward or forced by the boom member 30 in to the ground as required. For example, if a hole is being drilled by an auger attached to the boom head 60, as the depth is to be increased or if resistance is experienced, the angle between the boom and column members 30, 20 can be reduced, pushing the auger in to the ground. It will also be appreciated that a coordinated extension of the telescoping sections of the boom member 30 may also be required to maintain the position of the auger with respect to the hole.

It will be appreciated that by moving the column member 20 to an over-centre position, as shown in FIGS. 8 to 10 that the maximum operating radius and minimum operating radius are able to be increased and decreased respectively, allowing ground engaging tools to reach locations closer to the vehicle and further from the vehicle than if the column member had a fixed operating position. As shown in FIGS. 8 and 9, where the crane 1 is in tool mode and working at its maximum extension, corresponding to a maximum operating radius, it can be seen that the column member 20 has been moved to a fully extended over-centre position, the telescoping sections 32, 33 are fully extended, and the angle between the boom member 30 and column member 20 is such that the boom head 60 is positioned at or near a ground engaging position, enabling the use of ground engaging tools.

Figure 11:
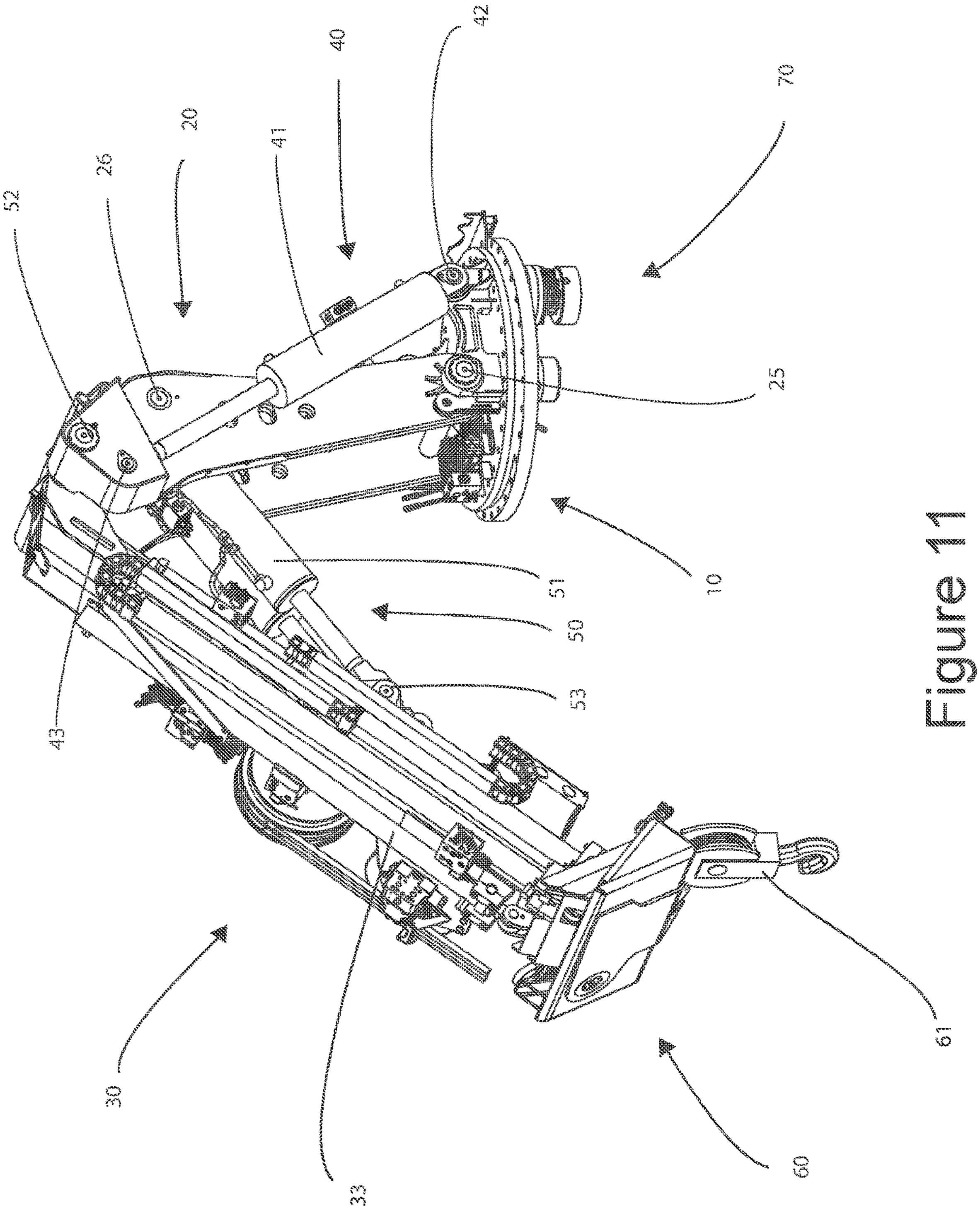
FIG. 11 is a perspective view of the crane of FIG. 1, in tool mode and at minimum extension.

As shown in FIGS. 10 and 11, where the crane 1 is in tool mode and working at its minimum extension, corresponding to a minimum operating radius, it can be seen that the column member 20 has been moved to a fully extended over-centre position, and the angle between the boom member 30 and column member 20 has been reduced to a point just before the boom member interferes with the body of the vehicle 100 (shown schematically as broken lines) and the telescoping sections 32, 33 remain fully retracted, with the boom head 60 positioned at or near a ground engaging position, enabling the use of ground engaging tools.

It will be appreciated that by varying one or both of the angles between the boom and column members 30, 20, and the degree of extension of the telescoping sections 32, 33, that crane 1 can operate in ground engaging mode at any point within its minimum and maximum operating radius.

While in the embodiment shown, the maximum angle able to be formed between the column and base is approximately 100 degrees and the maximum angle able to be formed between the boom and column is approximately 85 degrees, it will be appreciated that these maximum angles are governed by the geometry of the various elements making up the crane as well as the operational parameters of the hydraulic cylinders, including their maximum extended length and load ratings. It will further be appreciated that if required, the design could be modified to achieve larger angles without departing front the scope of this disclosure.

While the above disclosure has shown and described the crane 1 operating in a single plane, it will be appreciated that at least a portion of the crane 1 is capable of rotating or slewing with respect to the vehicle it is mounted to. In the embodiments shown, at least a portion of the base 10 is configured to rotate or slew by virtue of a motor and gearbox 70 located on the underside of the base 10, such that the base may be rotated or slewed with respect to the body of a vehicle that it may be mounted to.

It will also be appreciated that the above disclosure focuses on the basic structure of the crane 1 with respect to the moveable column and boom members 20, 30 and that further components, such as hydraulics circuits, pumps, power supplies and control systems are also employed as part of the overall crane assembly.

It will be appreciated that the above disclosure provides a crane 1 for mounting to a vehicle that is able to perform multiple operations or tasks that would typically be achieved by more than one apparatus, while also being capable of collapsing to a tight packaging requirement.

Furthermore, it will be appreciated that the above disclosure is not necessarily limited to ground vehicles, and could also be employed on trains or marine vessels, and may even be employed in a stationary environment.

Throughout the specification and the claims that follow, unless the context requires otherwise, the words “comprise” and “include” and variations such as “comprising” and “including” will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A crane for mounting to a vehicle, comprising:
   a base defining a plane;
   a column member pivotally connected with respect to the base at a first end; and,
   a column lifting arrangement, configured to adjust an angle of the column member with respect to the plane,
   wherein the column member is configured to be moved between a retracted position, where the column member lies substantially parallel with the plane defined by the base, through to a fully extended position, where the angle between the column member and the plane defined by the base is greater than 90 degrees; and
   a boom member pivotally connected with respect to the column member at a second end of the column member, and a boom lifting arrangement, configured to adjust an angle of the boom member with respect to the column member, wherein the boom member is configured to be moved between a retracted position, where the boom member lies substantially parallel with the column member, through to a fully extended position, wherein the boom lifting arrangement comprises a pair of hydraulic boom cylinders, wherein first ends of the pair of hydraulic boom cylinders are pivotally connected with respect to an intermediate portion of the column member and wherein second ends of the pair of hydraulic boom cylinders are pivotally connected with respect to an intermediate portion of the boom member, such that extension of the pair of hydraulic boom cylinders causes an increase in the angle between the boom member and the column member, and retraction of the pair of hydraulic boom cylinders causes a decrease in the angle between the boom member and the column member, and
   wherein the column member comprises parallel left and right web members and where the pair of hydraulic boom cylinders are positioned adjacent to one another with the first ends of the pair of hydraulic coom cylinders located between the left and right web members, and wherein the pair of hydraulic boom cylinders are configured such that when the pair of hydraulic boom cylinders are fully retracted, the boom and column members are able to be positioned alongside each other in a substantially parallel relationship, with the pair of hydraulic boom cylinders configured to nest substantially between the left and right web members and the boom member.

2. The crane as claimed in claim 1, wherein the angle between a fully extended column member and the plane defined by the base is approximately 100 degrees.

3. The crane as claimed in claim 1, wherein the column lifting arrangement comprises a pair of hydraulic column cylinders, wherein first ends of the pair of hydraulic column cylinders are pivotally connected with respect to the base about an axis parallel to and spaced apart from that an axis about which the column member is pivotally connected with respect to the base, and wherein second ends of the pair of hydraulic column cylinders are pivotally connected with respect to the second end of the column member, such that extension of the pair of hydraulic column cylinders causes an increase in the angle between the column member and the plane, and retraction of the pair of hydraulic column cylinders causes a decrease in the angle between the column member and the plane.

4. The crane as claimed in claim 3, wherein the pair of hydraulic column cylinders are double acting.

5. The crane as claimed in claim 1, wherein the angle between the fully extended boom member and the column member is approximately 85 degrees.

6. The crane as claimed in claim 1, wherein the pair of hydraulic boom cylinders are double acting.

7. The crane as claimed in claim 1, wherein the boom member comprises a main section to which the column member and the pair of hydraulic boom cylinders pivotally depend.

8. The crane as claimed in claim 7, wherein the boom member further comprises a plurality of telescoping sections, wherein the furthest telescoping section terminates in a boom head.

9. A vehicle comprising a body and a crane as claimed in claim 1, mounted to the body of the vehicle.

10. The vehicle as claimed in claim 9, wherein the base of the crane is configured to be rotated with respect to the body of the vehicle.

11. A crane for mounting to a vehicle, the crane comprising:
   a base defining a plane;
   a column member pivotally connected with respect to the base at a first end;
   a boom member pivotally connected with respect to the column member at a second end of the column member;
   a column lifting arrangement, configured to adjust an angle of the column member with respect to the plane; and
   a boom lifting arrangement, configured to adjust an angle of the boom member with respect to the column member,
   wherein the crane is able to be moved between a collapsed configuration, where the column member lies substantially parallel with the plane defined by the base and the boom member lies substantially parallel with the column member, and through to a range of operational configurations where the angle between the column member and the plane defined by the base is anywhere between approximately 0 and 100 degrees and the angle between the boom member and column member is anywhere between approximately 0 and 85 degrees,
   wherein the boom lifting arrangement comprises a pair of hydraulic boom cylinders, wherein first ends of the pair of hydraulic boom cylinders are pivotally connected with respect to an intermediate portion of the column member and wherein second ends of the pair of hydraulic boom cylinders are pivotally connected with respect to an intermediate portion of the boom member, such that extension of the pair of hydraulic boom cylinders causes an increase in the angle between the boom member and the column member, and retraction of the pair of hydraulic boom cylinders causes a decrease in the angle between the boom member and the column member, and
   wherein the column member comprises parallel left and right web members and where the pair of hydraulic boom cylinders are positioned adjacent to one another with the first ends of the pair of hydraulic boom cylinders located between the left and right web members, and wherein the pair of hydraulic boom cylinders are configured such that when the pair of hydraulic boom cylinders are fully retracted, the boom and column members are able to be positioned alongside each other in a substantially parallel relationship, with the pair of hydraulic boom cylinders configured to nest substantially between the left and right web members and the boom member.

12. The crane as claimed in claim 11, wherein the column lifting arrangement comprises a pair of hydraulic column cylinders, wherein first ends of the pair of hydraulic column cylinders are pivotally connected with respect to the base about an axis parallel to and spaced apart from an axis about which the column member is pivotally connected with respect to the base, and wherein second ends of the pair of hydraulic column cylinders are pivotally connected with respect to the second end of the column member, such that extension of the pair of hydraulic column cylinders causes an increase in the angle between the column member and the plane, and retraction of the pair of hydraulic column cylinders causes a decrease in the angle between the column member and the plane.

* * * * *